United States Patent [19]

Yang

[11] Patent Number: 5,248,321
[45] Date of Patent: Sep. 28, 1993

[54] PROCESS OF REMOVING SULFUR OXIDES FROM GASEOUS MIXTURES

[75] Inventor: Ralph T. Yang, Willaimsville, N.Y.

[73] Assignee: The Research Foundation of State University of New York at Buffalo, Buffalo, N.Y.

[21] Appl. No.: 926,776

[22] Filed: Aug. 6, 1992

[51] Int. Cl.$^5$ .............................................. B01D 53/04
[52] U.S. Cl. ........................................ 95/98; 95/137; 95/129; 95/900
[58] Field of Search ................. 55/25, 26, 58, 62, 73, 55/74

[56] References Cited

U.S. PATENT DOCUMENTS

| | | | |
|---|---|---|---|
| 2,944,627 | 7/1960 | Skarstrom | 55/62 X |
| 3,564,818 | 2/1971 | Lasky et al. | 55/73 |
| 3,607,002 | 9/1971 | Meyers | 23/25 |
| 3,646,594 | 2/1972 | Lasky et al. | 55/73 X |
| 3,727,379 | 4/1973 | Bijleveld et al. | 55/73 |
| 3,780,500 | 12/1973 | Clemens et al. | 55/73 |
| 3,816,355 | 6/1974 | Clemens | 55/73 X |
| 3,876,395 | 4/1975 | Cotter et al. | 55/73 |
| 3,907,972 | 9/1975 | Stautzenberger | 55/73 X |
| 3,917,469 | 11/1975 | Cotter et al. | 55/73 |
| 3,945,811 | 3/1976 | Beasley et al. | 55/73 |
| 4,003,848 | 1/1977 | Cotter et al. | 252/427 |
| 4,018,721 | 4/1977 | Cotter et al. | 55/73 X |
| 4,154,673 | 5/1979 | Otani et al. | 55/73 X |
| 4,191,732 | 3/1980 | Uraneck et al. | 55/73 X |
| 4,297,220 | 10/1981 | Meitzner et al. | 210/690 |
| 4,382,124 | 5/1983 | Meitzner et al. | 521/38 |
| 4,530,704 | 7/1985 | Jones et al. | 55/73 X |
| 4,783,327 | 11/1988 | Treybig et al. | 55/73 X |
| 4,853,191 | 8/1989 | Bruening et al. | 423/226 |
| 4,865,826 | 9/1989 | Carnell et al. | 55/73 X |
| 4,980,335 | 12/1990 | Sugo et al. | 55/73 X |

FOREIGN PATENT DOCUMENTS

| | | | |
|---|---|---|---|
| 52-011184 | 1/1977 | Japan | 55/75 |
| 55-003871 | 1/1980 | Japan | 55/73 |
| 0570384 | 9/1977 | U.S.S.R. | 55/73 |
| 0904749 | 2/1982 | U.S.S.R. | 55/73 |
| 1155287 | 5/1985 | U.S.S.R. | 55/73 |

OTHER PUBLICATIONS

Cole et al., "Adsorbing Sulfur Dioxide on Dry Ion Exchange Resins", *Ind. & Engg. Chem.* vol. 52, No. Oct. 10, 1960, pp. 859-860.

"Stability and Equilibrium Properties of Macroreticular Resins for Flue Gas Desulfurization", by Chen et al., Ind. Eng. Chem. Res., vol. 29, No. 3, pp. 440-447 (1990).

"Simultaneous $SO_2/NO_x$ Removal and $SO_2$ Recovery from Flue Gas by Pressure Swing Adsorption", Kikkinides and Yang, Ind. Eng. Chem. Res., vol. 30, pp. 1981-1989 (1991).

*Primary Examiner*—Robert Spitzer
*Attorney, Agent, or Firm*—Nixon, Hargrave, Devans & Doyle

[57] ABSTRACT

A process is provided for removing sulfur oxides from gaseous mixtures such as flue gases or tail gases. The process involves contacting the gaseous mixture with a non-functionalized polymeric sorbent which is essentially hydrophobic, such as styrenic polymers. The process may utilize pressure swing adsorption techniques, and is capable of producing a desorption stream with an $SO_2$ concentration suitable for immediate conversion to elemental sulfur by the Claus process.

21 Claims, No Drawings

PROCESS OF REMOVING SULFUR OXIDES FROM GASEOUS MIXTURES

FIELD OF THE INVENTION

This invention relates to the adsorption of sulfur oxides from gas mixtures and in particular to the use of hydrophobic non-functionalized polymer sorbents for removing sulfur oxides from gaseous exhaust mixtures.

BACKGROUND OF THE INVENTION

Sulfur oxides are present in many gaseous mixtures, including flue gases from power plants, smelter gases, and other gases emitted from various industrial operations. These gases are generated, for example, in refinery operations, coke processing, and sulfuric acid manufacturing. These sulfur-containing compounds are generally sulfur oxides, i.e., sulfur dioxide and sulfur trioxide.

The contamination of the atmosphere by sulfur oxides, whether present in power plant flue gases, smelter gases, etc., has long been known to be a problem for public health. It adversely affects respiratory systems, harms plant life and corrosively attacks various materials including metals. The development of processes for removing sulfur oxides from gaseous mixtures is therefore highly desirable.

U.S. Pat. No. 3,607,002 to Meyers relates to a process for removing sulfur oxides, e.g., sulfur dioxides, from hot gaseous mixtures by passing the gaseous mixtures over aniline black compounds, e.g., migrosine copper phthalocyanine, pyrolyzed polyacrylonitrile or pyrolyzed polyvinylchloride.

U.S. Pat. No. 4,003,848 to Cotter et al. discloses contacting moist sulfur-containing gaseous mixtures with a crosslinked, water-insoluble polymer of N-glycidyl piperazine or N-glycidyl polyalkylpiperazines at a temperature of about $-10°$ to about $100°$ C. to adsorb sulfur dioxide from gas mixtures.

It is known to utilize polar, functionalized polymers as ion exchange resins in desulfurization processes. Ion exchange resins typically have ionic groups attached to a polymer, and basically operate by donating or accepting protons. Suitable functionalized polymers for ion exchange processes include, for example, those having polar groups bonded thereto, in particular basic substituent groups, such as primary, secondary, or tertiary amine groups.

For example, U.S. Pat. No. 4,853,191, to Bruening et al., discloses the use of copolymers of Polymerizable vinyl compounds which contain tertiary amino groups as ion exchange resins. These resins are utilized in the presence of $H_2O$ to remove sulfur oxides from industrial gases.

"Stability and Equilibrium Properties of Macroreticular Resins for Flue Gas Desulfurization", by Chen et al., Ind. Eng. Chem. Res., Vol. 29, No. 3, pp 440–447 (1990), discloses macroreticular ion-exchange resins, based on a copolymer matrix of styrene and divinyl benzene, for use as adsorbents for flue gas desulfurization. One of these macroreticular weak-base ion exchange resin, Dowex MWA-1, was found to be suitable as an adsorbent, in the presence of water vapor in a temperature swing adsorption process, for flue gas desulfurization. Temperature swing adsorption processes typically can take hours to complete a single adsorption cycle.

Unfortunately, functionalized ion exchange resins are very hydrophilic, hence water competes with sulfur dioxide for adsorption. Moreover, water causes swelling of resins, making it impossible to operate in fixed bed adsorbers. For these reasons, the resins have not been used commercially for $SO_2$ removal.

The current practices for sulfur dioxide removal require wet scrubbing desulfurization techniques. Scrubbers are devices for washing or absorbing gases by dissolving or reacting the gases with liquids, such as, for example, limestone solutions. One common problem with wet scrubbers is the formation of corrosive sulfuric acid aerosols which cause such processes to be difficult to operate and maintain. A further problem occurs in the case of scrubbers utilizing limestone solutions, namely, the formation of $CaSO_3$ and $CaSO_4$, which is a pollutant in itself.

In addition, each fixed bed adsorbent material has a certain capacity for adsorbing particular consituents. Consequently, the quicker the cycle times, the higher the efficiency any particular adsorbent bed will be. Unfortunately, many processes in the prior art exhibited long cycle times, i.e., of 30 minutes or more. Thus, there still is a need for an efficient and economical desulfurization process which generates a nonpolluting sulfur end product.

SUMMARY OF THE INVENTION

The present invention relates to an efficient and economical process for removing sulfur oxides from gaseous mixtures by contacting the gaseous mixture with an adsorbent formed from a non-functionalized polymer which is essentially hydrophobic. The polymer, which has a relatively high $SO_2/CO_2$ selectivity, preferably comprises a styrenic or olefinic compound. As a result, sulfur oxides in the gaseous mixture are adsorbed onto the non-functionalized polymer, thereby removing them from the gaseous mixture.

It has also been found that contacting the polymer with a nitrogen-containing compound, either prior to or during contact with the gaseous mixture, saturates the polymer's affinity for the nitrogen-containing compounds. This does not significantly affect the polymer's $SO_2/CO_2$ selectivity, nor does it affect the polymer's affinity for $SO_2$ or its tendency to be substantially hydrophobic.

Preferably, the polymer is disposed within at least two absorbing chambers which receive and treat the gaseous mixture. As a result, one of the chambers may be adsorbing sulfur oxides while another of the chambers may be regenerated. In a preferred embodiment using a pressure swing adsorption process, regeneration may be achieved by, for example, drawing a vacuum on the chamber, purging the chamber with a suitable sweep gas, or both.

The polymers of the present invention have a high $SO_2$ adsorption capacity and diffusivity. An additional advantage of the present invention is that the desorption product is sufficiently rich in $SO_2$ so as to be suitable for conversion to elemental sulfur by the Claus process, yielding a non-polluting end product having commercial value.

DETAILED DESCRIPTION OF THE INVENTION

The present invention relates to a process for removing sulfur oxides from gaseous mixtures. The invention involves contacting the sulfur-containing gaseous mixture with a non-functionalized polymer, i.e., which is not capable of accepting or donating protons. The polymers are consequently hydrophobic. Preferably, these polymers are substantially resistant to adsorption of $CO_2$.

The polymer, which has a relatively high $SO_2/CO_2$ selectivity, preferably comprises a styrenic or olefinic compound. It has been found that by contacting gaseous mixtures with such polymers, sulfur dioxide can be removed from such mixtures.

The polymers of the present invention may be formed by copolymerizing a monoethylenically unsaturated monomer and polyvinylidene monomers such as is disclosed in U.S. Pat. Nos. 4,382,124 and 4,297,220 to Meitzner et al., the specifications of which are hereby incorporated by reference. Thus, as described in these patents, suitable monoethylenically unsaturated monomers, including monovinylidene monomers, include the following: methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, styrene, vinyltoluene, vinylnaphthalene, and similar unsaturated monomers.

Another class of suitable monovinylidene monomers include the monovinylidene ring-containing nitrogen heterocyclic compounds, such as vinylpyridine, 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine, 2-methyl-5-vinylquinoline, 4-methyl-4-vinylquinoline, 1-methyl- or 3-methyl-5-vinylisoquinoline and vinylpyrrolidone.

Copolymers of the above monomers with monovinylene compounds, such as dialkyl maleates, dialkyl fumarates, dialkyl crotonates, dialkyl itaconates, and dialkyl glutaconates, are also possible.

Suitable polyvinylidene compounds include the following: divinylbenzene, divinylpyridine, divinyltoluenes, divinylhaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono-, or dithio- derivatives of glycols, and or resorcinol; divinylketone, divinylsulfide, allyl acrylate, diallyl maleate, diallyl fumarate diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, 1,2-di($\alpha$-methylmethylene sulfonamido)ethylene, trivinylbenzene, trivinylnaphthalene, and polyvinylantracenes.

Particularly preferred polyvinylidene monomers include the following: polyvinylaromatic hydrocarbons, such as divinylbenzene and trivinylbenzene, glycol dimethacrylates, such as ethylene glycol dimethacrylate, and polyvinyl ethers of polyhydric alcohols, such as divinoxyethane and trivinoxypropane.

If a monovinylaromatic hydrocarbon is used as the monovinylidene monomer, and a divinylaromatic hydrocarbon, such as divinylbenzene, is used as the polyvinylidene monomer, a cross-linked polystyrene is formed on copolymerization. Such polystyrene and polydivinylbenzene compounds are particularly preferred polymers in accordance with the present invention.

Suspension copolymerization can be used to produce the polymers of the present invention in the form of spherical beads, the size of which can be controllably varied over wide ranges. Such beads are particularly suitable as polymers in accordance with the present invention. Preferably, such beads have a diameter of between 0.01 and 10 mm, and, more preferably, between 1 and 5 mm.

The adsorptive properties of the polymers of the present invention come from their $\pi$ electrons, lack of functional groups, high surface area and the presence of small pores in their structure. Preferred polymers in accordance with the present invention are styrenic or olefinic polymers. Preferred examples of such polymers include divinyl benzene, ethylvinyl benzene, styrene, and mixtures thereof. Examples of preferred styrenic polymers in accordance with the present invention include XUS-40323, and XUS-43436, manufactured by Dow Chemical, Midland, Mich., and XAD-2, XAD-4, and XAD-16, manufactured by Rohm & Haas Company, Philadelphia, Pa. The composition of these polymers are listed in Table 1 below.

As illustrated in Table 1, in a preferred embodiment of the invention, the polymer includes at least 45 percent, and more preferably, at least 75 percent divinylbenzene. The remainder of these polymers may be made up of ethylvinylbenzene, styrene, or a mixture thereof.

TABLE 1

| Trade Name (Source) | Comp. | Surface Area, $m^2/g$ | Mean Pore Size, Å |
|---|---|---|---|
| XUS-40323 (Dow) | ~80% DVB ~20% EVB | 650 | 100 |
| XUS-43436 (Dow) | ~80% DVB ~20% EVB | 1400 | 28 |
| XAD-2 (Rohm & Haas) | 50% DVB 35% EVB 15% Sty | 350 | 190 |
| XAD-4 (Rohm & Haas) | 84% DVB 16% EVB | 790 | 60 |
| XAD-16 (Rohm & Haas) | 75% DVB 25% EVB | 900 | 157 |

(DVB = divinylbenzene, EVB = ethylvinyl benzene, Sty = styrene)

The nonfunctional polymeric adsorbents of the present invention exhibit an increased rate of $SO_2$ adsorption over conventional ion exchange resins.

For example, thermogravimetric analysis (TGA) experiments have shown that XUS-40323 can achieve in about 1 minute an $SO_2$ adsorption capacity similar to that reported for Dowex MWA-1 (an ion exchange resin) in 60 minutes.

Using the results from the TGA experiments, the uptake rates of $CO_2$, $SO_2$, and $NO_x$ on XUS-40323 were studied using a computer simulated adsorption bed apparatus. Uptake rates are a measure of the weight gain of the sorbent during adsorption, and can be used to calculate the amount adsorbed, the rate of adsorption, etc. Although $CO_2$ diffuses faster than $SO_2$ (because it is a smaller molecule), the difference in their diffusion rates is not large. Further, in polymers such as XUS-40323, the equilibrium adsorption amount for $CO_2$ is reached much faster than for $SO_2$. Consequently, after a short period of exposure to $CO_2$, this polymer becomes essentially $CO_2$-phobic.

In another aspect of the invention, $NO_x$ may also be initially chemisorbed onto the surface of polymers such as XUS-40323. This chemisorption was supported by infrared spectroscopy studies which showed $NO_x$ groups bonded to the surface of the polymer. The chemisorbed $NO_x$ could not be desorbed by purging with pure $N_2$ at temperatures below about 80° C. However, the $NO_x$ could be desorbed by heating to about 80° to 90° C. For XUS-40323, the polymer quickly becomes saturated with $NO_x$ even at low partial pressures, e.g., less than 0.1 atmospheres. Consequently, exposure of the polymers of the present invention to conventional flue gases, even for a short period of time, will quickly saturate the polymer's ability to adsorb $NO_x$, after which the polymer essentially is $NO_x$-phobic.

To determine whether this $NO_x$ treatment had any effect on the polymer's ability to adsorb $SO_2$, further TGA experiments were performed on both untreated and $NO_x$-treated polymers in accordance with the present invention, in particular, XUS-40323. The resulting isotherms indicated that $NO_x$ treated sorbents had a slightly higher capacity for both $SO_2$ and $CO_2$. However, no significant change in the $SO_2/CO_2$ selectivity was seen. Furthermore, water vapor isotherms on the $NO_x$ treated sample indicate that the $NO_x$ treated polymeric sorbent did not lose its affinity for being substantially hydrophobic. For example, at relative humidities of approximately 50 percent, approximately 4 to 6 milligrams $H_2O$ per gram of sorbent material was typically adsorbed onto the sorbent.

The polymers of the present invention exhibited a larger capacity for adsorbing $SO_2$, $CO_2$ and $NO_x$ as the surface area of the polymer increased. Consequently, the polymer XAD-16 listed in Table 1, which had a surface area of 900 $m^2/g$, had a higher adsorption capacity than XUS-40323, which had a surface area of 650 $m^2/g$. Preferably, the polymers of the present invention have a surface area between 100 and 2,000 $m^2/g$ and, more preferably, between 500 and 2,000 $m^2/g$. However, this is not meant to limit the invention, and thus, the polymers could have a surface area of greater than 2,000 $m^2/g$, since in most instances it is advantageous to maximize the surface area of the polymer.

A preferred method for contacting the sulfur-containing gaseous mixture with the polymers of the present invention can be carried out with an apparatus having two or more adsorption chambers, each capable of receiving and treating the flow of gaseous mixture. Gas flowing through the chambers contacts the adsorbing polymer of the present invention to effect desulfurization. One preferred form of this apparatus is known as a pressure swing adsorption (PSA) apparatus, such as is disclosed in U.S. Pat. No. 2,944,627 to Skarstrom, the specification of which is hereby incorporated by reference. Operation of a PSA apparatus typically involves the following four step procedure, known as a Skarstrom cycle: 1) pressurization of the chamber, in which the pressure inside the chamber increases as the gaseous mixture begins to flow into the chamber; 2) high pressure feed, in which the chamber pressure has stabilized at the relatively high pressure supplied by the flow of the flue gas therethrough (during steps 1 and 2 sulfur dioxide is being adsorbed from the gaseous mixture); 3) regeneration by countercurrent blowdown or evacuation, in which the flow of gaseous mixture is halted, thus reducing the pressure inside the chamber to an atmospheric level; and 4) countercurrent purge with a material capable of desorbing the sorbents. During step 2 of the typical four step cycle, the pressure fluctuates between 1 and 10 atm. Preferably, the pressure during step 2 is about 1.0 atm. In a preferred embodiment of the invention, a co-current depressurization step is added to the above-described four step Skarstrom cycle. In the co-current depressurization, after the high pressure feed, but prior to blowdown, the chamber is connected to a vacuum pump to decrease the pressure, commonly at least to 0.3 to 0.4 atmospheres. At the same time, the gaseous mixture continues to flow through the chamber. The vacuum lowers the pressure inside the voids on the surface of the polymer, which increases the polymers ability to adsorb $SO_2$ Preferably, the desulfurization takes place at a temperature between about $-20°$ and 80° C.

The polymers of the present invention may be desorbed using conventional methods. For example, in the four step and five step Skarstrom processes discussed above, the chamber containing the saturated polymer may be purged with a material capable of desorbing the polymer. In typical commercial PSA apparatuses, as many as three or four chambers are being utilized simultaneously. Typically, only one of these several chambers are undergoing an adsorption step at any one time. Since the gas flow exiting the chamber after adsorption is essentially $SO_2$ free, a portion of this gas is typically diverted into another bed as purge gas for desorbing the latter bed. The amount of gas being diverted is expressed as a purge/feed ratio, which is the amount diverted divided by the total amount of flow. Preferably, the purge/feed ratio is between about 0 and 5 percent of the total flow. More preferably, the purge/feed ratio is between 1 and 4 percent. Alternatively, an externally inert gas, e.g., helium gas, nitrogen or steam, may be contacted with the saturated polymer, causing a desorption of $SO_2$ from the polymer to occur, thereby producing a desorption stream of carrier gas containing $SO_2$.

Concentrations of $SO_2$ in the desorption stream of as high as 9 percent have been simulated using TGA data. Concentrations greater than 5 percent are considered suitable for immediate transformation to elemental sulfur by the Claus process. Consequently, the raw desorption stream produced by the present invention may be immediately converted to elemental sulfur using the Claus process, with no need further to concentrate the $SO_2$. The Claus Process typically involves conversion of $SO_2$ to elemental sulfur using the following reaction:

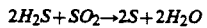

$$2H_2S + SO_2 \rightarrow 2S + 2H_2O$$

Consequently, the $SO_2$-rich desorption stream may be fed to a Claus reactor along with a suitable amount of $H_2S$ to produce elemental sulfur and water. For several examples of technologies utilizing the Claus process, see "Energy Technology Handbook", Mc-Graw-Hill, Chapters 1, 2, and 9 (1977).

The invention may be more easily comprehended by reference to specific examples. It must be understood, however, that these examples are provided only for purposes of illustration, and that the invention may be practiced otherwise than as specifically illustrated without departing from its spirit and scope. All of the following examples were produced by computer simulation using data generated with the help of thermogravimetric analysis, such as equilibrium adsorption isotherms, diffusion rate, heat of adsorption, and heat of desorption of the polymer.

EXAMPLES

Example 1

A simulated pressure swing adsorption (PSA) apparatus was studied using computer simulation. An NO pre-treated XAD-16 polymer sorbent was utilized to remove $SO_2$ from conventional flue gas. A 500 centimeter long adsorbent bed having a bed diameter of 100 centimeters, a bed density of 0.4 grams per $cm^3$ of spherical XAD-16 polymeric sorbent beads, and a void fraction of 0.4 was chosen as the PSA sorbent bed. Void fraction is a measure of the total percentage of voids in the packed bed and includes both the voids on the beads themselves, and voids between beads in the packed bed. The feed composition of the simulated flue gas was 81.5 $N_2$ 18 $CO_2$ 0.5 $SO_2$. The gas feed flow rate was about $1 \times 10^6$ liters (STP) per hour. The pressure at the inlet of the chamber during adsorption cycle was approximately 1.2 atmospheres, while the pressure in the chamber during desorption cycle was approximately 0.03 atmospheres. A four step typical Skarstrom cycle as described above was used. The total cycle time was approximately 9 minutes.

The molar purge/feed ratio (i.e., P/F) was varied by changing the purge flow rate. The results of adsorption and desorption product volume-averaged concentrations and $SO_2$ recoveries are summarized in Table 2.

TABLE 2

| P/F | Product Stream $SO_2$ | Product Stream $CO_2$ | Desorption Stream $SO_2$ | Desorption Stream $CO_2$ | $SO_2$ Recovery (%) |
|---|---|---|---|---|---|
| 0.005 | 0.211 | 16.75 | 8.39 | 59.76 | 65.9 |
| 0.010 | 0.140 | 17.76 | 8.97 | 54.32 | 79.9 |
| 0.015 | 0.078 | 17.77 | 9.07 | 50.07 | 91.9 |
| 0.020 | 0.034 | 17.78 | 8.86 | 47.00 | 99.2 |
| 0.025 | 0.012 | 17.78 | 8.39 | 44.52 | 100.0 |
| 0.030 | 0.004 | 17.78 | 7.83 | 42.41 | 100.0 |

Volume-Averaged Effluent Concentration, %

Illustrated in Table 2, the concentrations listed under product stream were the concentrations of the flue gas after adsorption. The concentrations under the chamber desorption stream were the concentrations after desorption. The percent $SO_2$ recovery refers to the percentage of $SO_2$ removed from the gaseous mixture. As illustrated in Table 1, at room temperature, the polymers of the present invention are capable of easily removing 90 to 95 percent of the $SO_2$ from conventional flue gas mixtures. Further, the results of Table 2 show that the present invention is easily capable of generating desorption streams having a sufficiently high $SO_2$ content for immediate conversion to elemental sulfur by the Claus process. For example, using a purge to feed ratio of 2 percent, a desorption stream of 8.86 percent $SO_2$ was generated.

EXAMPLE 2

A simulation identical to Example 1 was conducted, except that the gas feed temperature was 60° C., rather than 25° C. The results of Example 2 are listed below in Table 3.

TABLE 3

| P/F | Product Stream $SO_2$ | Product Stream $CO_2$ | Desorption Stream $SO_2$ | Desorption Stream $CO_2$ | $SO_2$ Recovery (%) |
|---|---|---|---|---|---|
| 0.010 | 0.191 | 17.17 | 7.25 | 42.49 | 71.4 |
| 0.015 | 0.118 | 17.19 | 7.75 | 39.84 | 85.0 |
| 0.020 | 0.060 | 17.19 | 7.90 | 37.78 | 95.4 |
| 0.030 | 0.008 | 17.20 | 7.28 | 34.92 | 100.0 |

Volume-Averaged Effluent Concentration, %

The results of Table 3 indicate that when feeding the flue gas to the adsorber at the higher gas feed temperature of 60° C., the concentrated $SO_2$ and the desorption product is reduced to about 8 percent, while the $SO_2$ recovery remains at 90 to 100 percent.

Example 3

A PSA apparatus similar to that in Example 1 was simulated, except that a five step Skarstrom cycle was utilized rather than the conventional four step cycle. Thus, a cocurrent depressurization step was introduced after the adsorption and before the blowdown step. Further, complete cycle time for the five step cycle was 20 minutes (about 4 minutes per step), rather than the 9 minute cycle as in Example 1. The pressure during the cocurrent depressurization step, PCD, was varied from 0.8 to 0.06 atmospheres.

The results, illustrated in Table 4, show a significant increase in $SO_2$ enrichment achieved by using the five step process as compared to the corresponding four step process illustrated in Example 1. Further, as PCD is increased, higher $SO_2$ enrichment is achieved, while the product purity as well as the $SO_2$ recovery are decreased. Thus, using the five step Skarstrom cycle, a 12 to 12.5 percent $SO_2$ concentration in the desorption stream could be achieved, while the $SO_2$ recovery was near 95 percent.

TABLE 4

| $P_{CD}$ (atm) | Product Stream $SO_2$ | Product Stream $CO_2$ | Desorption Stream $SO_2$ | Desorption Stream $CO_2$ | $SO_2$ Recovery (%) |
|---|---|---|---|---|---|
| 0.80 | 0.011 | 17.24 | 8.52 | 37.29 | 100.0 |
| 0.60 | 0.012 | 17.29 | 9.15 | 37.32 | 100.0 |
| 0.30 | 0.015 | 17.48 | 10.41 | 35.71 | 100.0 |
| 0.10 | 0.023 | 17.95 | 11.59 | 29.45 | 97.6 |
| 0.06 | 0.030 | 18.15 | 12.40 | 25.80 | 95.6 |

Volume-Averaged Effluent Concentration, %

The invention has been described in detail with reference to preferred embodiments thereof, but it will be understood that variations and modifications can be effected within the scope of the invention.

What is claimed:

1. A process for the removal of sulfur oxides from gaseous mixtures comprising:
    providing a gaseous mixture comprising sulfur oxides; and
    contacting said gaseous mixture with a non-functionalized polymer which is essentially hydrophobic under conditions effective for the sulfur oxides to be adsorbed onto said polymer.

2. A process according to claim 1, wherein said polymer comprises a styrenic or olefinic compound.

3. A process according to claim 2, wherein said polymer is selected from the group consisting of divinylbenzene, ethylvinylbenzene, styrene, and mixtures thereof.

4. A process according to claim 3, wherein said polymer comprises at least 45 percent divinylbenzene.

5. A process according to claim 4, wherein said polymer further comprises ethylvinylbenzene.

6. A process according to claim 3, wherein said polymer comprises at least 75 percent divinylbenzene.

7. A process according to claim 1, wherein said polymer is substantially resistant to the adsorption of $CO_2$ 8. A process according to claim 1, wherein nitrogen oxides in the gaseous mixture are adsorbed onto said polymer during said contacting.

9. A process according to claim 1, wherein said contacting said gaseous mixture further comprises:
providing at least two adsorbing chambers for receiving and treating said gaseous mixture, each chamber containing said polymer;
adsorbing sulfur oxides from said gaseous mixture onto the polymer in one of said chambers; and
regenerating the polymer in another of said chambers during said absorbing.

10. A process according to claim 9, wherein said regenerating comprises:
discontinuing contact between said polymer and said gaseous mixture; and
contacting said polymer with a sweep gas to remove adsorbed sulfur oxides therefrom.

11. A process according to claim 9, wherein said regenerating comprises:
discontinuing contact between said polymer and said gaseous mixture; and
drawing a vacuum on said chamber to remove adsorbed sulfur oxides therefrom.

12. A process according to claim 9, wherein said contacting said gaseous mixture utilizes a pressure swing adsorption apparatus.

13. A process according to claim 1, wherein said polymer is comprised of particles having a surface area of at least 100 $m^2/g$.

14. A process according to claim 13, wherein said particles are essentially spherical.

15. A process according to claim 1, wherein said contacting is carried out at a temperature of between $-20°$ and $80°$ C.

16. A process according to claim 1, further comprising:
regenerating said polymer after its ability to adsorb sulfur oxides is saturated.

17. A process according to claim 1, wherein said gaseous mixture is a flue gas or tail gas.

18. A process according to claim 1, further comprising:
the steps of converting sulfur oxides into elemental sulfur using a Claus process.

19. A process for producing a non-functionalized hydrophobic polymer which is highly adsorbent to sulfur oxides yet highly resistant to adsorbing $CO_2$ gas comprising:
providing a styrene or olefin based polymer; and
exposing said polymer to a flow of nitrogen oxides gases until said polymer's ability to adsorb nitrogen oxides compounds is essentially saturated.

20. A process for the selective removal of sulfur oxides from gaseous mixtures comprising:
providing at least two adsorbing chambers for receiving and treating a gaseous flow, each of said chambers containing a polymer supported therein, said polymer comprising a non-functionalized hydrophobic styrene or olefin based compound which is substantially resistant to the adsorption of $CO_2$;
passing a gaseous mixture comprising sulfur oxides through the chamber and in contact with the polymer in at least one of said chambers, whereby said polymer adsorbs sulfur oxides from said gaseous mixture; and
regenerating periodically said chambers by:
discontinuing said passing a gaseous mixture; and
desorbing said sulfur oxides from said polymer.

21. A process according to claim 20, wherein said passing a gaseous mixture is occurring in one of said chambers while said regenerating is occurring in another of said chambers.

* * * * *